United States Patent
Bartlett

[11] 3,878,393
[45] Apr. 15, 1975

[54] SELECTIVE EMITTER OFFSET RADIATION SOURCE FOR COMPENSATING RADIATION DETECTORS FOR SELECTIVE RADIATION EMITTED THEREFROM

[75] Inventor: Allen W. Bartlett, Stratford, Conn.

[73] Assignee: Barnes Engineering Company, Stamford, Conn.

[22] Filed: Dec. 5, 1973

[21] Appl. No.: 422,116

[52] U.S. Cl. .................. 250/349; 250/352; 250/504
[51] Int. Cl. ............................................. G01t 1/16
[58] Field of Search ........... 250/339, 340, 342, 349, 250/493, 495, 504, 352; 219/553

[56] References Cited
UNITED STATES PATENTS
3,348,048  11/1967  McLaughlan et al. ............... 250/349

Primary Examiner—James W. Lawrence
Assistant Examiner—Davis L. Willis
Attorney, Agent, or Firm—Joseph Levinson, Esq.; Robert Ames Norton, Esq.

[57] ABSTRACT

A selective radiation offset heat source is provided in the form of a sphere of material that emits radiation of a predetermined wavelength when heated. The sphere is heated by a resistance element that is conductively attached to the underside of the sphere. Radiation loss is further conserved by surrounding the spherical source with a polished spherical gold-plated enclosure such that radiation is reflected back upon itself except for optical areas which apply the emitted radiation to infrared detectors which are desired to be compensated for radiation losses of the same preselected wavelength emitted by the offset radiation heat source.

8 Claims, 2 Drawing Figures

3,878,393

SELECTIVE EMITTER OFFSET RADIATION SOURCE FOR COMPENSATING RADIATION DETECTORS FOR SELECTIVE RADIATION EMITTED THEREFROM

BACKGROUND OF THE INVENTION

This invention relates to a selective emitter offset radiation heat source for use in infrared sensors which compensates the infrared detectors in such sensors for radiation losses emitted in selective wavelengths of interest.

In many infrared sensor systems the infrared detectors employed have an output which depends on difference signals generated by the detector elements. For example, a thermopile output is proportional to the difference in temperature between its active and reference junctions. In many infrared sensor applications, the detector generates large amplitude detector output signals where in reality what is desired to be detected would appear only as a small change in such a large amplitude detector output. For example, in infrared horizon sensors which detect the thermal discontinuity between cold outer space and the edge of a planet, thermopile detector junctions viewing space or cold earth radiate heat and become colder than the reference junctions. The result is a large amplitude detector output. Changes in the horizon image within this field would appear as small changes in this large negative voltage, producing a problem of detecting a small change in a large voltage in order to locate accurately the horizon. This problem is dealt with in horizon sensors by providing a space viewing detector which is used to subtract out the large negative signals generated in the horizon viewing detectors. If detectors with perfectly matched responsivities were available, no other corrections would be necessary. However, detectors can only be matched imperfectly, and further means of reducing space-generated voltages are required. One means of accomplishing this result is to use an offset radiation heat source to compensate for heat loss to space by the detectors. One form of offset radiation heat source is shown and described in U.S. Pat. No. 3,348,048, entitled "Horizon Sensor with a Plurality of Fixedly Positioned Radiation Compensated Radiation Sensitive Detectors." A flat, non-selective radiator was provided which suffers the disadvantage of requiring power to emit radiation which was not needed or even desirable. Also, the application of the proper amount of radiation in the desired wavelength is difficult to control, and to apply properly to the desired detectors. The present invention constitutes an improvement over the offset radiation heat source of the aforesaid patent.

Accordingly, it is an object of the present invention to provide an improved offset radiation heat source which emits radiation of predetermined wavelength, thus requiring less power by saving the power previously needed to generate radiation in wavelengths where no compensation is needed.

A further object of the present invention is to provide an improved offset radiation heat source which is small in size, economical in power dissipation, and easier to control.

Still another object of this invention is to provide an improved offset radiation heat source having a configuration which is easy to control and apply the emitted radiation with minimal losses to the detectors desired to be compensated.

SUMMARY OF THE INVENTION

In carrying out this invention in one illustrative embodiment thereof, a selective radiation offset heat source is provided in the form of a sphere of material that emits radiation in a predetermined wavelength. The sphere is controllably heated by a resistance element that is conductively attached to the under side of the sphere. The spherical source is surrounded by a spherical polished enclosure such that radiation is reflected back upon itself except for predetermined areas which are utilized to apply the emitted radiation to the detectors which are desired to be compensated for radiation losses of the same predetermined wavelength emitted by the offset radiation heat source.

DESCRIPTION OF THE PREFERRED EMBODIMENTS

Figure 1:
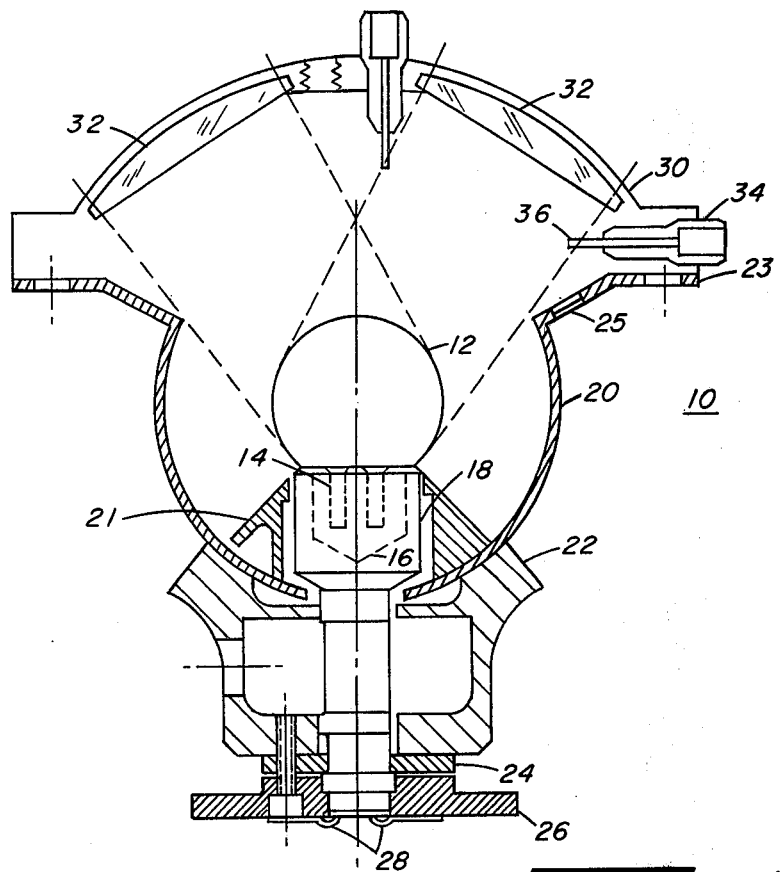
FIG. 1 shows the offset radiation heat source embodied in this invention, partly in section, together with one form of housing.

Referring now to FIG. 1, the selective emitter offset radiation source assembly is referred to generally with the reference character 10. The source 12 is comprised of a ball or sphere of suitable material, such as glass, on which a suitable evaporated coating is applied thereto to make a selective emitter thereof. For the application hereinafter described, namely that for use on an horizon sensor, the material may be of polycrystalline zinc sulfide made by Eastman Kodak Company, Rochester, New York, and sold under the trademark Irtran-2 which has a high emittance in the system spectral bandpass of approximately the $15\mu$ carbon dioxide band. At wavelengths below $12\mu$, the ball or sphere 12 of Irtran-2 is transparent, and therefore a poor emitter. By providing an emitter which is spectrally limited, electrical power is conserved by limiting the energy emitted by the heaters utilized to heat the ball 12. The power to heat the sphere or ball 12 is obtained from a resistance heater 14 that is conductively attached to the under side of the ball 12. The heater 14 consists of two (for redundancy) Type RWR-81 beryllium oxide core resistors encased in a stainless steel housing 16. One of the end caps of each resistor is silver brazed to the housing 16 to provide a good thermal path from the resistor core to the housing and in turn to the source 12. The heater 14 and source 12 are supported by a glass bonded mica stem 18. A solder glass bond is used to attach the source 12 and the heater 14 to the stem 18. Heater leads 28 are brought out on the under side of the stem 18. Full redundancy is achieved with two resistive heaters in which only one is powered at any one time. The stem 18 is mounted in a housing 22 which in turn is mounted on a base 26 having a washer 24 between the housing 22 and the base 26.

Attached to the upper end of housing 22 is a spherical reflector 20 having a radiation shield 21 on a lower surface thereof, and terminating in a flange 23 on the upper end thereof, having screened openings 25 therein. The purpose of the spherical reflector 20 is to conserve radiation loss by surrounding the source 12 with a polished spherical, gold-plated enclosure. Radiation from the source 12 is reflected back onto itself except for the areas occupied by the lenses mounted in an upper enclosure 30 to be explained hereinafter. The radiation shield 21 ensures that the radiation is reflected back to the ball and not absorbed by the stem 18. The specular finish on the inside of the spherical reflector 20, which is greater than a hemisphere, is achieved by proper electroforming on a polished aluminum ball. The aluminum is leached away by caustic solution, leaving the copper shell that is then gold plated. The radiation shield 21 is also gold plated.

The upper enclosure 30 for the offset radiation source assembly 10, which provides a mounting means for a plurality of offset radiation field lenses 32, is machine-polished and gold-plated aluminum. The lenses 32 are cemented in the enclosure 30, and are utilized to direct the selective radiation emitted by the ball 12 to detectors in an infrared sensor for providing compensation for radiation losses from the detectors. The radiation received from the offset radiation source assembly 10 by each of the detectors to be compensated would, by first order of approximation, be the same. However, because of manufacturing tolerances, non-uniformity of transmission of the lens materials, temperature gradients, differences between the various detector assemblies and other minor variations, the corresponding detector outputs are not matched to a degree necessary to achieve over-all system accuracy. Accordingly, a plurality of occulting screws 34, having occulting screw shanks 36, are provided on the upper enclosure 30 directly behind the lenses 32. The location of the screws 34 is such that each one intersects only the radiation directed to a particular detector. Because each screw shank 36 is located behind and close to a lens 32, it will form a blurred image on a detector field lens to provide the desired compensation and control the amount of radiation provided for the detector compensation. The screws 34 are engaged and heat-sunk to the aluminum upper enclosure 30. The radiation received by each detector to be compensated will be diminished in proportion to the occulted area of each of the screw shanks 36.

Figure 2:
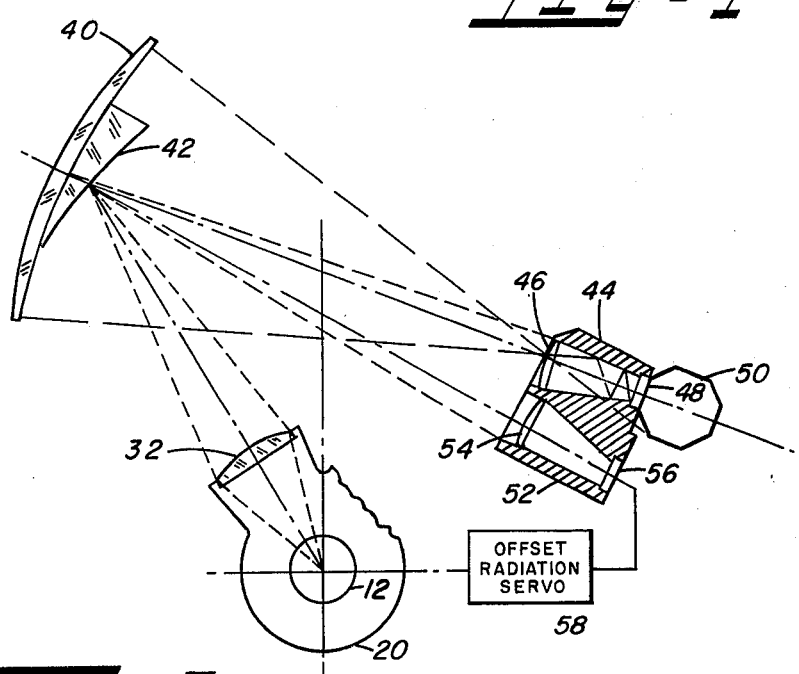
FIG. 2 is an optical schematic diagram illustrating the manner in which the radiation emitted from the offset radiation heat source shown in FIG. 1 may be applied in one form of infrared sensor system.

Merely to illustrate an application of the offset radiation source assembly embodied in this invention, its application will be illustrated with respect to a horizon sensor of the type shown and described in U.S. Pat. No. 3,551,681 which utilizes a plurality of radiometric cells properly positioned to provide horizon position information. Referring now to FIG. 2, which is a diagrammatic representation only of a partial sensor system, a germanium objective lens 40 forms an image of the horizon to which it is directed on field lenses 46 and 54 which are located on the front of a cone 44 and detector 48, and a cone 52 and detector 56, respectively. The front surface of the objective lens 40 is coated to reflect 80 percent of the sun's energy in the 0.4 to 2.4$\mu$ spectral band, while the rear surface is coated to reflect solar energy and to block transmission in the 1.8$\mu$ to 12$\mu$ spectral band. Accordingly, the system is sensitive only to the infrared radiation above the 12$\mu$ band and likewise any radiation losses to outer space would also be restricted to the region of 12$\mu$ and above. The field lenses 46 and 54 are mounted at the entrance of each optical condensing cone cavity 44 and 52, respectively.

They limit the acceptance angle of the detectors 48 and 56 to the solid angles subtended by the objective lens 40. In addition, the field lenses 46 and 54 and the optical cones 44 and 52 scramble the horizon image at the detectors 48 and 56 to prevent possible non-uniform detector response from degrading the linearity of the system's transfer function. The optical cavities 44 and 52 serve as condensing elements to provide optical gain by illuminating their detectors over a full 2$\pi$ steradians. As shown in FIG. 2, the two extreme rays which cross near the center of the field lens 46 define the tetrahedron's image polygon 50, and all rays which pass through the objective lens and intersect the image polygon 50 reach the detector 48. For purposes of this disclosure, it will be assumed that the detector 56 continually views the cold outer space. In reality, the detector cone assemblies are comprised of four such assemblies for the system illustrated, with four objective lenses. For ease of illustration, however, and of explanation, a description of the entire system is omitted, and the partial one shown is described.

The preferred detector for the sensor system illustrated in FIG. 2 is a thermopile detector, but it will be appreciated that the present invention is not restricted to this type of detector, and the offset radiation heat source embodied herein will be applicable to any infrared detector where similar problems exist.

The output of thermopiles 48 and 56 is proportional to the difference in temperature between its active and reference junctions. Junctions viewing space or cold earth radiate heat and become colder than the reference junction. The result is a large amplitude detector output which is not the signal which is desired. Changes in the horizon image within this field would appear as small changes in a large negative voltage, producing a problem of detecting a small change signal, which is desired, in a large voltage.

To circumvent this problem, the output of a space-viewing detector, for example detector 56, could be used to subtract out the large negative signals generated in the horizon-viewing detectors. If a detector with perfectly matched responsivities were available, no other corrections would be necessary. Realistically, however, detectors can only be matched imperfectly (i.e., approximately 1 percent), and further means of reducing space-generated voltage are required. The offset radiation heat source assembly 10 is thus utilized to compensate for heat lost to space by the detectors.

The offset radiation source 10 consists of a thermal radiator located in the common optical aperture of the sensor, which is controlled by an offset radiation servo 58 to drive the most negative space reference detector 56 to zero. This source replaces the radiation the detectors are emitting to space, and reduces the large offset signal to zero. The space-viewing detector 56, in addition to providing a reference for the horizon-detecting sensor 48, now also acts as an error sensor for the offset radiation electronic servo 58.

The offset radiation lenses 32 image the offset radiation source 12 into a field mirror 42 cemented to the rear surface of each objective lens 40. The offset radiation field mirrors 42 image the lenses 32 onto the field lenses 46 and 54, and their corresponding detector cone assemblies. Since the offset radiation source 12 is imaged on the field mirror 42 and not on the field lenses themselves, any variations in the offset radiation heater emittance will be uniformly distributed over the field lenses. As has been pointed out, the offset radiation source is a selective emitter, only emitting at 12 microns and above, which corresponds to the same energy which the system illustrated in FIG. 2 is responsive to, and the same spectral ranges where losses occur. By making the offset radiation heat source selective, power is conserved by running the heat source only for selected radiation, whose loss needs to be compensated for, and the prevention of unwanted radiation from casting around the system. In the example chosen for purposes of disclosure, the objective lenses have a 59 mm. diameter, while the field mirror diameter of 23 mm. provides little obscuration of the field of view of the sensor. As was previously explained, the occulting screws 34 also provide a means of controlling the amount of radiation applied to the individual cone detector assemblies.

It is believed apparent that the small spherical configuration of the offset radiation source 12, with its selective emittance characteristics, which may be varied in accordance with the sensitivity of particular sensor systems, offers many advantages for providing radiation compensation to detectors plagued by radiation losses, making the accuracy as well as a sensor assembly in which it is used practical. The provision of a spherical reflector which limits losses, and the means for controlling the radiation directed to a specific detector, make the use of the offset radiation heat source of the present invention highly desirable in applications where needed. Although the application of the selective offset radiation heat source has been applied to horizon sensors, where severe problems exist and high accuracy is required, it will be apparent that the offset radiation heat source embodied in this invention can be utilized in other infrared sensor applications where similar, though perhaps not as serious, problems exist.

Since other modifications and changes, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

I claim:

1. In an infrared sensor having a plurality of infrared detector means of the type which produce a zero output signal when radiation into the detector means equals radiation emitted from the detector means, and optical means for selectively imaging infrared radiation of predetermined wavelengths onto the detector means, the improvement which comprises
    a. a spherical selective emitter offset radiation heat source for emitting radiation of predetermined wavelength, enclosed in a reflective spherical housing,
    b. means for applying radiation from said spherical selective emitter offset radiation heat source to said detector means, and
    c. means actuated by an output signal from said detector means acting as a reference for varying the temperature of said selective emitter offset radiation source until the selective radiation therefrom applied to said detector means equals the radiation emitted by said detector means.

2. The structure set forth in claim 1 wherein said selective emitter offset radiation heat source comprises a ball of material which emits only in a selected spectral region and a resistance heater conductively attached to the under side of said ball.

3. The structure set forth in claim 2 in which said ball of material consists of polycrystalline zinc sulfide.

4. The structure set forth in claim 1 wherein said reflective spherical housing comprises a lower reflective enclosure and an upper enclosure in which lenses are mounted for imaging radiation emitted from said source on said detector means.

5. The structure set forth in claim 4 having adjustable means mounted in said upper enclosure in close proximity to said lens for controlling the amount of radiation imaged on said detectors.

6. A selective emitter offset radiation source for emitting radiation in a predetermined spectral band to compensate detectors for loss of radiation in the same spectral band comprising
    a. a ball of material which emits radiation in a predetermined spectral region when heated,
    b. a heater means conductively attached to the under side of said ball,
    c. a spherical housing having an upper and lower enclosure which enclose said ball of material, and
    d. optical means mounted in said upper enclosure for imaging the radiation emitted by said ball of material on a detector desired to be compensated thereby,
    e. said lower enclosure being reflective so that radiation is reflected back to the ball except for the radiation tranmsitted by said optical means.

7. The structure set forth in claim 6 having radiation control means for varying the amount of radiation passed through said lenses.

8. The structure set forth in claim 7 wherein said radiation control means comprises occulting screws having screw shanks adjustably extending therefrom mounted in said upper enclosure in close proximity to said optical means such that said screw shanks may be adjusted to variably obscure a portion of the field of the optical means, thereby controlling the amount of radiation applied from said ball of material.

* * * * *